US009358584B2

(12) United States Patent
Li et al.

(10) Patent No.: US 9,358,584 B2
(45) Date of Patent: Jun. 7, 2016

(54) SIFTING DEVICE

(71) Applicants: SHENZHEN FUTAIHONG PRECISION INDUSTRY CO., LTD., Shenzhen (CN); FIH (HONG KONG) LIMITED, Kowloon (HK)

(72) Inventors: Ching-Chuan Li, New Taipei (TW); Zhen-Hua Zhang, Shenzhen (CN); Yang Zhang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/550,095

(22) Filed: Nov. 21, 2014

(65) Prior Publication Data

US 2015/0174616 A1 Jun. 25, 2015

(30) Foreign Application Priority Data

Dec. 20, 2013 (CN) .......................... 2013 1 0706387

(51) Int. Cl.

| | |
|---|---|
| ***B65G 53/38*** | (2006.01) |
| ***B07B 4/08*** | (2006.01) |
| ***B07B 1/55*** | (2006.01) |
| ***B07B 13/00*** | (2006.01) |
| ***B07B 13/16*** | (2006.01) |

(52) U.S. Cl.
CPC ... *B07B 4/08* (2013.01); *B07B 1/55* (2013.01); *B07B 13/003* (2013.01); *B07B 13/16* (2013.01)

(58) Field of Classification Search
USPC .................. 406/136, 137; 198/380, 390, 452; 221/168
See application file for complete search history.

(56) References Cited

U.S. PATENT DOCUMENTS 3,710,920 A * 1/1973 Sterling ................ B67B 3/0645 198/380
3,757,995 A * 9/1973 Armstrong ............. B23Q 7/106 221/211

(Continued)

*Primary Examiner* — Joseph Dillon, Jr.
(74) *Attorney, Agent, or Firm* — Novak Druce Connolly Bove + Quigg LLP

(57) ABSTRACT

A sifting device for workpieces includes a box, an electric cabinet, a sifting assembly, an air blower, and an collector. The box receives the workpieces. The sifting assembly is received in the box, and includes a baffle and a guiding board, the guiding board defines a plurality of gaps, and a slit is formed between the baffle and the guiding board, and communicates with the plurality of gaps. The air blower is directed by the electric cabinet and communicates with the gap to adjust a direction of the workpieces to allow the workpieces to pass through the gap and the slit. The collector communicates with the slit to output the workpieces.

12 Claims, 6 Drawing Sheets

(56) References Cited

U.S. PATENT DOCUMENTS

| | | | | | |
|---|---|---|---|---|---|
| 3,871,295 | A * | 3/1975 | Ackley | B65G 47/1485 | 101/232 |
| 4,215,954 | A * | 8/1980 | George | B65G 47/1407 | 198/953 |
| 4,953,749 | A * | 9/1990 | Kubota | H05K 13/027 | 221/168 |
| 4,995,157 | A * | 2/1991 | Hall | H05K 13/022 | 198/385 |
| 5,513,739 | A * | 5/1996 | Berg | B65G 47/256 | 198/380 |
| 5,853,108 | A * | 12/1998 | Ando | H05K 13/027 | 221/112 |
| 5,984,079 | A * | 11/1999 | Garcia | G01R 31/013 | 198/392 |
| 6,089,796 | A * | 7/2000 | Ando | H05K 13/028 | 221/163 |
| 6,116,821 | A * | 9/2000 | Teoh | B23P 19/005 | 406/112 |
| 6,116,822 | A * | 9/2000 | Teoh | B65G 47/1407 | 198/468.2 |
| 6,120,216 | A * | 9/2000 | Teoh | H05K 13/028 | 406/1 |
| 6,210,079 | B1 * | 4/2001 | Teoh | B23P 19/005 | 406/12 |
| 6,210,081 | B1 * | 4/2001 | Saho | B23P 19/004 | 198/533 |
| 6,250,852 | B1 * | 6/2001 | Kai | B65G 47/1407 | 406/137 |
| 6,435,338 | B1 * | 8/2002 | Iwamoto | B65G 47/1485 | 198/396 |
| 6,443,669 | B2 * | 9/2002 | Saito | 198/390 | |
| 6,484,902 | B1 * | 11/2002 | Rouse | B65D 88/70 | 221/278 |
| 6,616,385 | B1 * | 9/2003 | Raginskii | B65G 35/00 | 406/85 |
| 6,662,953 | B1 * | 12/2003 | Rouse | B65D 88/70 | 209/682 |
| 7,004,353 | B2 * | 2/2006 | Yamamoto | B65B 5/103 | 221/277 |
| 7,223,060 | B2 * | 5/2007 | Weidenmuller | B29C 35/16 | 406/159 |
| 7,255,247 | B2 * | 8/2007 | Aylward | B65B 35/08 | 221/168 |
| 7,284,934 | B2 * | 10/2007 | Hoogers | H05K 13/027 | 221/278 |
| 7,464,803 | B2 * | 12/2008 | Cashimere | B65G 47/086 | 198/389 |
| 7,740,424 | B2 * | 6/2010 | Pardini | B07B 4/00 | 406/136 |
| 7,815,033 | B2 * | 10/2010 | Feierabend | B65G 47/1471 | 198/389 |
| 7,850,403 | B2 * | 12/2010 | Lorange | B65G 51/03 | 198/397.03 |
| 8,051,971 | B2 * | 11/2011 | Marti Sala | B65G 47/1457 | 198/392 |

* cited by examiner

SIFTING DEVICE

FIELD

The subject matter herein generally relates to sifting devices, and particularly relates to a sifting device for workpieces.

BACKGROUND

In assembly of electronic devices, such as mobile phones, multiple workpieces such as nuts usually need to be fixed to components of the electronic devices. The multiple workpieces are sifted according to directions of the workpieces or other criteria by manual operation, thus causing inefficiency.

BRIEF DESCRIPTION OF THE DRAWINGS

Implementations of the present technology will now be described, by way of example only, with reference to the attached figures.

DETAILED DESCRIPTION

Figure 1:
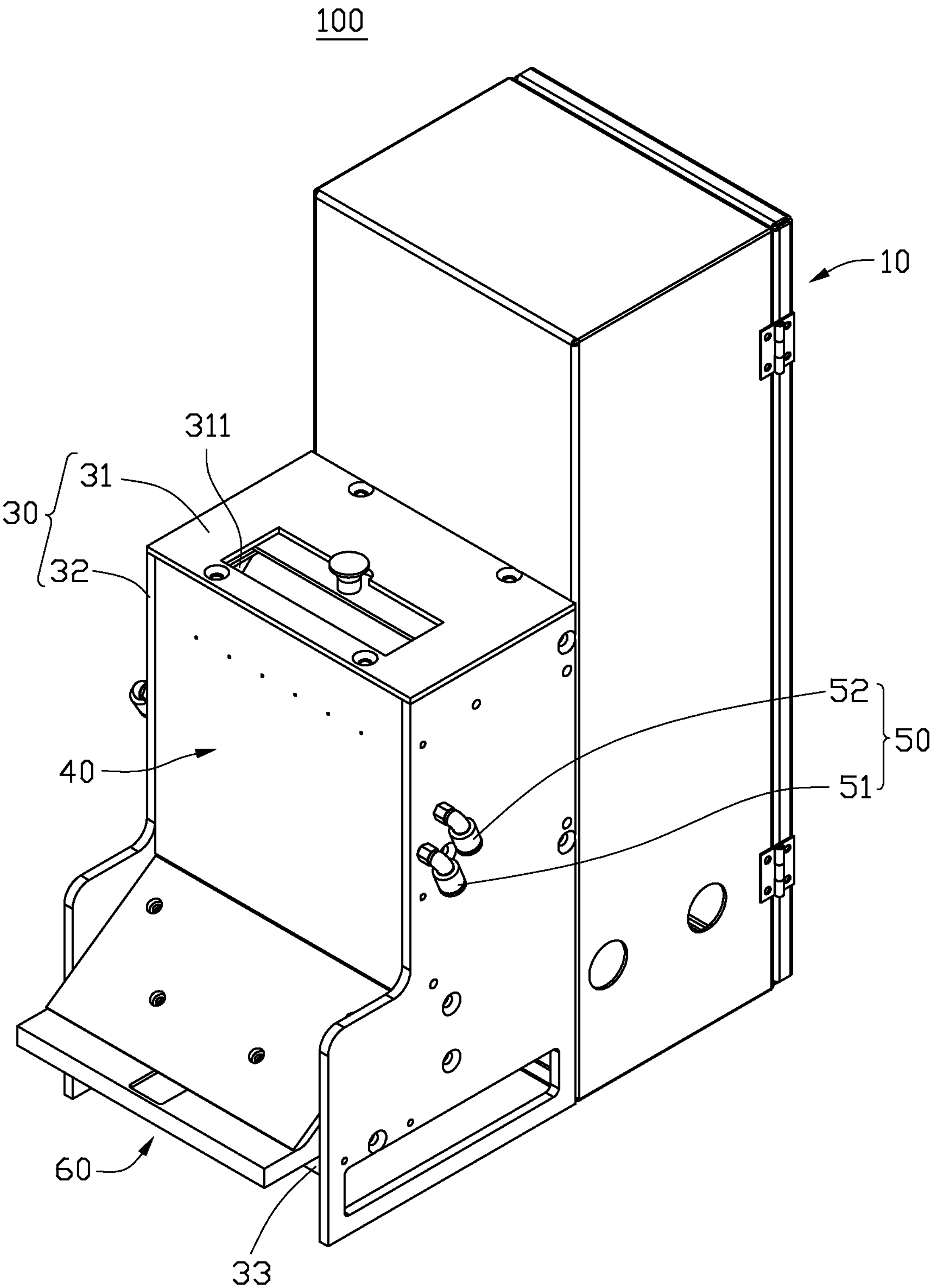
FIG. 1 is an assembled, isometric view of a sifting device, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is described in relation to a sifting device.

FIG. 1 illustrates an embodiment of a sifting device 100, according to an exemplary embodiment. The sifting device 100 is configured to sift multiple types of workpieces 200 (FIG. 5), such as nuts. The sifting device 100 includes an electric cabinet 10, a box 30, a sifting assembly 40, an air blower 50, and a collector 60. The electric cabinet 10 and the box 30 are positioned back to back. The sifting assembly 40 is received in the box 30, the air blower 50 is disposed on two sides of the box 30 and is directed by the electric cabinet 10, and the collector 60 communicates with the box 30.

Figure 2:
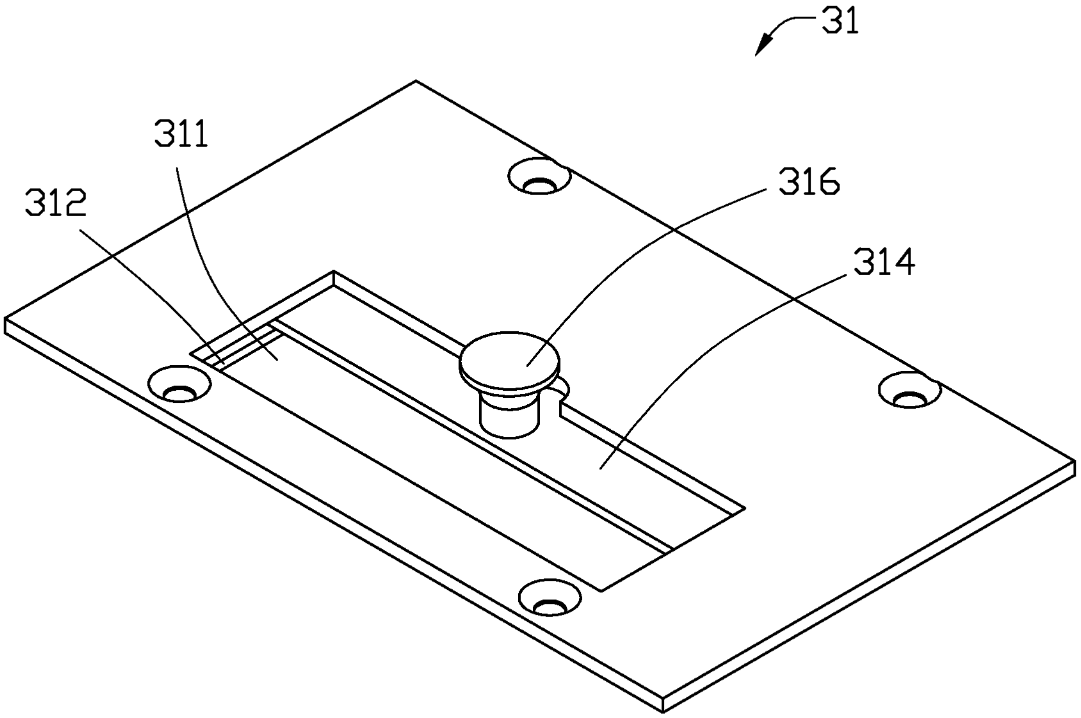
FIG. 2 is an isometric view of a top plate of the sifting device of FIG. 1.

The box 30 includes a top plate 31, two side plates 32, and a bottom plate 33. The two side plates 32 are connected to two opposite sides of the top plate 31. The bottom plate 33 connects to the two side plates 32 and is aligned with the top plate 31. Also referring to FIG. 2, the top plate 31 defines an opening 311 to allow the workpieces 200 to be dumped into the box 30. In addition, the top plate 31 further forms two rails 312. A sliding board 314 slides between the two rails 312, and a handle 316 is mounted on the sliding board 314. When the handle 316 is manually actuated, the sliding board 314 is driven by the handle 316 to slide along the two rails 312 to open or close the opening 311.

Figure 4:
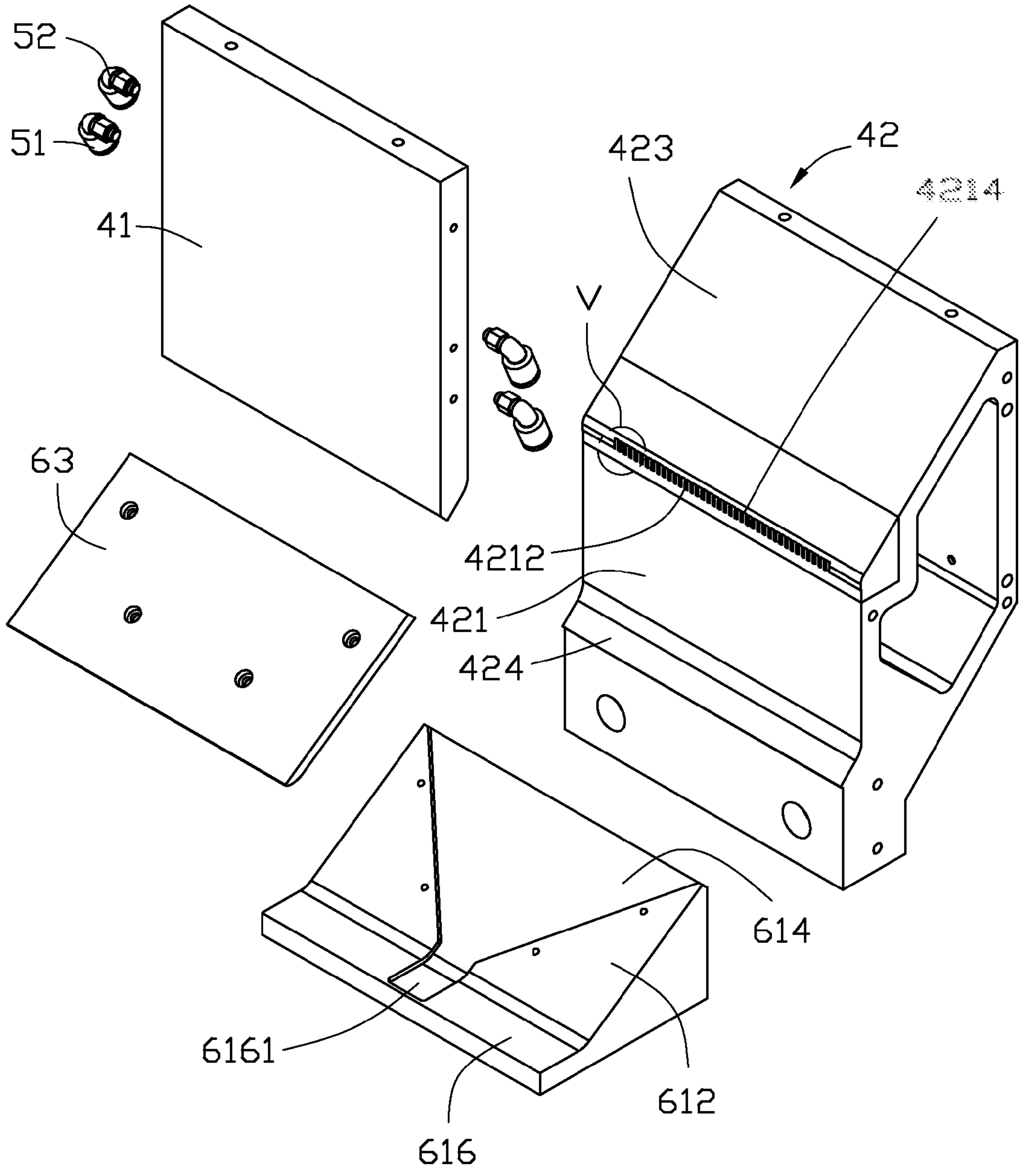
FIG. 4 is an exploded, isometric view of the sifting assembly, the collector, and the air blower of FIG. 3.
Figure 5:
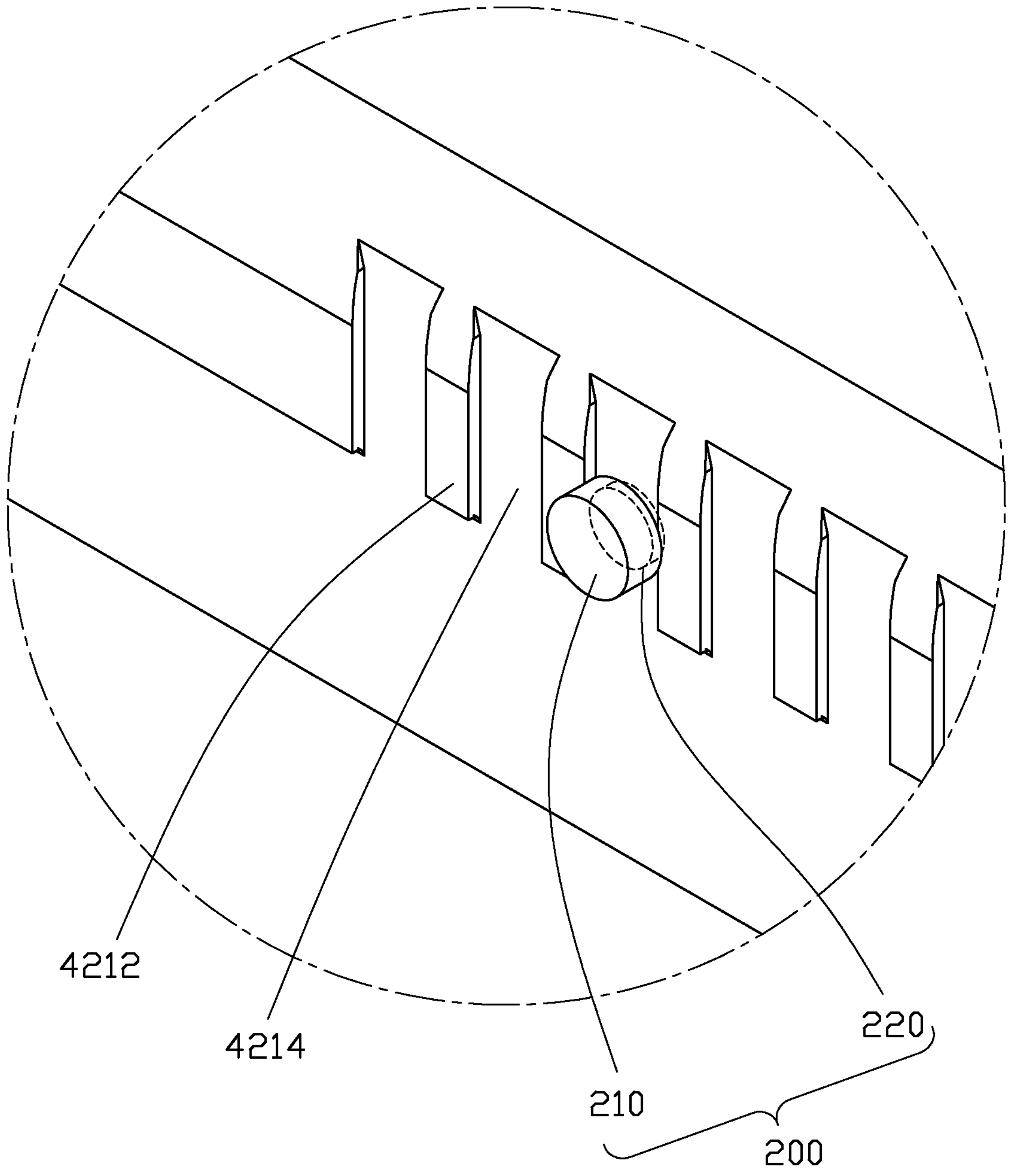
FIG. 5 is an enlarged, isometric view of circled portion V shown in FIG. 4.
Figure 6:
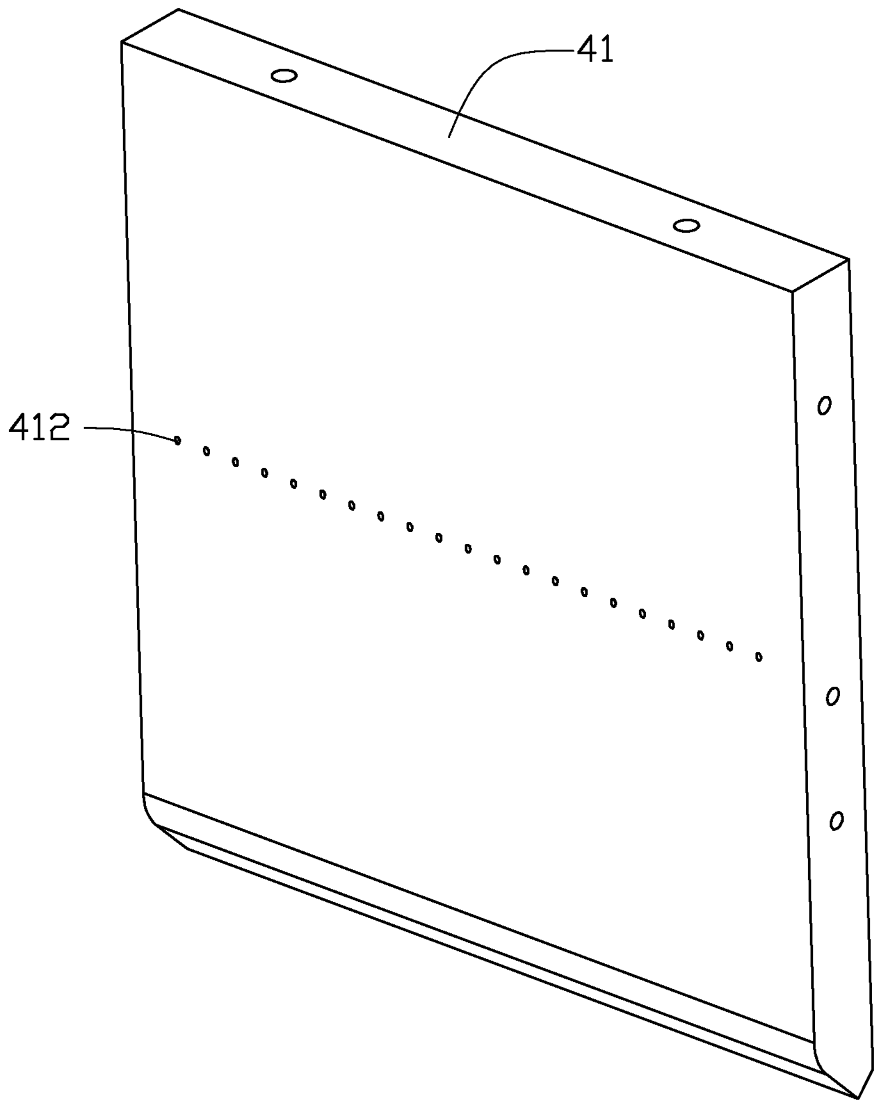
FIG. 6 is an isometric view of a baffle of the sifting assembly of FIG. 3.

Referring to FIG. 5, in at least one embodiment, each workpiece 200 includes a head 210 and a rod 220. Also referring to FIG. 3, FIG. 4, and FIG. 6, a first end of the sifting assembly 40 is positioned adjacent to the top plate 31, and a second end of the sifting assembly 40 connects the collector 60. In detail, the sifting assembly 40 includes a baffle 41 and a guiding board 42. The baffle 41 receives a pipe therein and defines a plurality of holes 412 communicating with the pipe and the air blower 50.

The guiding board 42 includes a vertical plane 421, a first inclined plane 423, and a second inclined plane 424. The first inclined plane 423, the baffle 41, and the top plate 31 cooperatively define an accommodation space 425 for receiving the workpieces 200 through the opening 311. The vertical plane 421, the second inclined plane 423, and the baffle 41 cooperatively define a slit 427 (FIG. 3) communicating with the accommodation space 425 and the collector 60, and then the workpieces 200 can vertically pass through the slit 427. The vertical plane 421 is connected between the first inclined plane 423 and the second inclined plane 424, and forms a plurality of blocks 4212 adjacent to a junction of the accommodation space 425 and the slit 427. Thus, a plurality of gaps 4214 are defined between two adjacent blocks 4212, and each gap 4214 aligns with one of the plurality of holes 412 (Fig.). In at least one embodiment, a width of the gap 4214 is greater than a diameter of the rod 220, and is less than a diameter of the head 210. Additionally, a distance between the block 4212 and the baffle 41 is greater than a length of the head 210, and is less than a length of the workpiece 200. Thus, the workpiece 200 properly aligned with the gap 4214 can pass through the gap 4214, and cannot be stuck in the slit 427. The workpiece 200 properly aligned with the gap 4214 indicates that the rod 220 of the workpiece 200 is perpendicularly received in the gap 4214, and the head 210 of the workpiece 200 faces the baffle 41.

The air blower 50 is connected to a pump accommodated in the electric cabinet 10 for adjusting a direction of the workpieces 200. The air blower 50 includes two first nozzles 51 and two second nozzles 52. Each side plate 32 has a first nozzle 51 and a second nozzle 51 installed thereon. The two first nozzles 51 communicate with two opposite end of the pipe in the baffle 41 to blow the workpieces 200 misaligned in the gap 4214. The two second nozzles 52 are oppositely positioned a junction of the accommodation space 425 and the slit 427 to blow the workpieces 200 to a middle portion of the accommodation space 425.

The collector 60 is configured to output the workpieces 200 sifted by the sifting assembly 40, and includes a baseplate 61 and a protective plate 63. The baseplate 61 has a guiding plane 612 defining a guiding groove 614. In at least one embodiment, the guiding groove 614 has an inverted triangle shape and communicates with the slit 427 for receiving the workpieces 200. An extending portion 616 horizontally extending from an end of the baseplate 61 defines a receiving groove 6161 communicating with the guiding groove 614. The protective plate 63 resists the guiding plane 612 to prevent the workpieces 200 from reversing during a period of sliding in the guiding groove 614.

Figure 3:
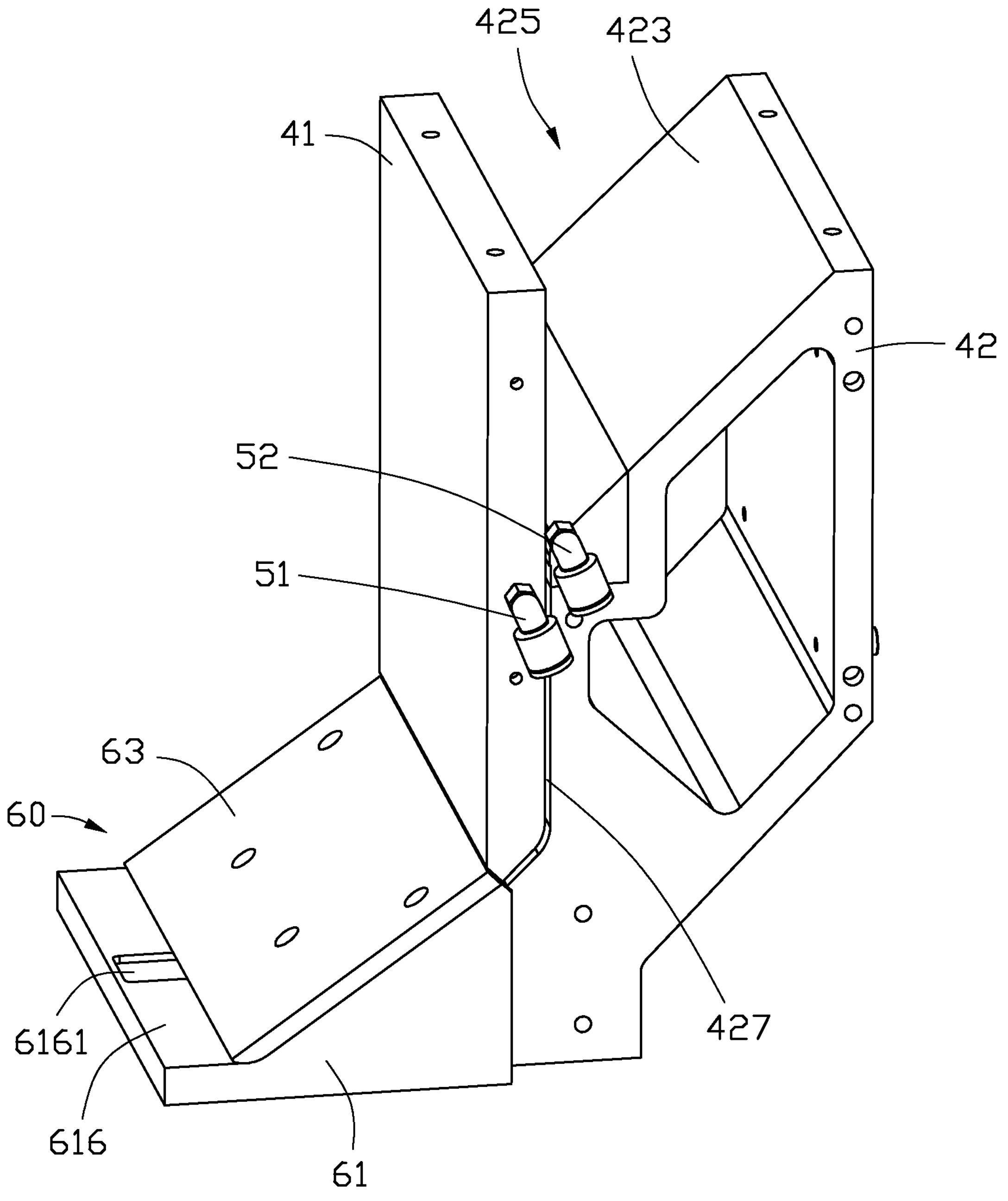
FIG. 3 is an assembled, isometric view of a sifting assembly, an collector, and an air blower of the sifting device of FIG. 1.

In use, also referring to FIGS. 3 and 4, the electric cabinet 10 is turned on, and the handle 316 is manually actuated. The sliding board 314 is driven by the handle 316 to slide along the two rails 312 to open the opening 311, and a plurality of workpieces 200 are dumped into the accommodation space 425 via the opening 311. The workpieces 200 slide to the junction of the accommodation space 425 and the slit 427, and then the workpieces 200 with the specific direction passes through the gap 4214, the slit 427, the guiding groove 614, and the receiving groove 6161.

In another aspect, the workpieces 200 with other directions are misaligned in the gap 4214. Then, the pump accommodated in the electric cabinet 10 is actuated, the air is injected into the baffle 41 via the two first nozzles 51, and is ejected from the holes 412 to blow the workpieces 200 misaligned in the gap 4214. Additionally, the air is injected into the accommodation space 425 and the slit 427 via the two second nozzles 52 to blow the workpieces 200 located at the accommodation space 425. Thus, the direction of a part of the workpieces 200 may be changed to pass through the gap 4214 and the slit 427, and the other workpieces 200 may be misaligned in the gap 4214 again. And that cycle repeats, all of the workpieces 200 can be passed through the gap 4214 and the slit 427, and then entered into the receiving groove 6161.

In summary, the baffle 41 and the guiding board 42 jointly define the slit 427, and the guiding board 42 further defines the gaps 4214. Thus, the workpieces 200 with the specific direction can pass through the gap 4214, and cannot be stuck in the slit 427. Since the air blower 50 can blow the workpieces 200 to adjust the direction of the workpieces 200, thus, the workpieces 200 can be sifted by the sifting device 100, thereby saving human cost and improving work efficiency.

The embodiments shown and described above are only examples. Many details are often found in the art such as the other features of the sifting device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A sifting device for workpieces, the sifting device comprising:

a box configured to receive the workpieces and comprising a top plate;

an electric cabinet;

a sifting assembly received in the box, the sifting assembly comprising a baffle and a guiding board, the guiding board defining a plurality of gaps, and a slit formed between the baffle and the guiding board, and communicating with the plurality of gaps;

an air blower directed by the electric cabinet and communicating with the gap to adjust a direction of the workpieces to allow the workpieces to pass through the gap and the slit; and an collector communicating with the slit to output the workpieces;

wherein the workpiece comprises a head and a rod, the rod is perpendicularly in the gap and the head faces the baffle, thus to be in the direction of passing through the gap and the slit;

wherein the guiding board comprises a vertical plane, a first inclined plane, and a second inclined plane, the first inclined plane, the baffle, and the top plate cooperatively define an accommodation space for receiving the workpieces, the vertical plane, the second inclined plane, and the baffle cooperatively define the slit; and wherein the vertical plane forms a plurality of blocks adjacent to a junction of the accommodation space and the slit, and the plurality of gaps are defined between two adjacent blocks.

2. The sifting device as claimed in claim 1, wherein the box further comprises two side plates, and a bottom plate, the two side plates are connected to two opposite sides of the top plate, the bottom plate connects to the two side plates and is aligned with the top plate.

3. The sifting device as claimed in claim 2, wherein the top plate defines an opening and forms two rails, a sliding board slides along the two rails to open or close the opening.

4. The sifting device as claimed in claim 2, wherein the baffle defines a plurality of holes communicating with the air blower, and each gap aligns with one of the plurality of holes.

5. The sifting device as claimed in claim 4, wherein the air blower comprises two first nozzles and two second nozzles, the two first nozzles communicate with the baffle to blow the workpieces misaligned in the gap, the two second nozzles are oppositely positioned a junction of the accommodation space and the slit to blow the workpieces to a middle portion of the accommodation space.

6. The sifting device as claimed in claim 1, wherein the collector comprises a baseplate and a protective plate, the baseplate has a guiding plane defining a guiding groove, the guiding groove communicates with the slit, the protective plate resists the guiding plane.

7. A sifting device for workpieces, the sifting device comprising:

a box configured to receive the sifting assembly and comprising a top plate;

an electric cabinet;

a sifting assembly comprising a baffle and a guiding board, the guiding board defining a plurality of gaps, and a slit formed between the baffle and the guiding board, and communicating with the plurality of gaps;

an air blower directed by the electric cabinet and communicating with the gap; and an collector communicating with the slit to output the workpieces, wherein a part of the workpieces pass through the gap, the slit, and the collector, and other workpieces are misaligned in the gap, the air blower blows the workpieces misaligned in the gap to adjust the direction of the workpieces;

wherein the workpiece comprises a head and a rod, the rod is perpendicularly in the gap and the head faces the baffle, thus to be in the direction of passing through the gap and the slit;

wherein the guiding board comprises a vertical plane, a first inclined plane, and a second inclined plane, the first inclined plane, the baffle, and the top plate cooperatively define an accommodation space for receiving the workpieces, the vertical plane, the second inclined plane, and the baffle cooperatively define the slit; and wherein the vertical plane forms a plurality of blocks adjacent to a junction of the accommodation space and the slit, and the plurality of gaps are defined between two adjacent blocks.

8. The sifting device as claimed in claim 7, wherein the box comprises a top plate, two side plates, and a bottom plate, the two side plates are connected to two opposite sides of the top plate, the bottom plate connects to the two side plates and is aligned with the top plate.

9. The sifting device as claimed in claim 8, wherein the top plate defines an opening and forms two rails, a sliding board slides along the two rails to open or close the opening.

10. The sifting device as claimed in claim 8, wherein the baffle defines a plurality of holes communicating with the air blower, and each gap aligns with one of the plurality of holes.

11. The sifting device as claimed in claim 10, wherein the air blower comprises two first nozzles and two second nozzles, the two first nozzles communicate with the baffle to blow the workpieces misaligned in the gap, the two second nozzles are oppositely positioned a junction of the accommodation space and the slit to blow the workpieces to a middle portion of the accommodation space.

12. The sifting device as claimed in claim 7, wherein the collector comprises a baseplate and a protective plate, the baseplate has a guiding plane defining a guiding groove, the guiding groove communicates with the slit, the protective plate resists the guiding plane.

* * * * *